Figure 1:
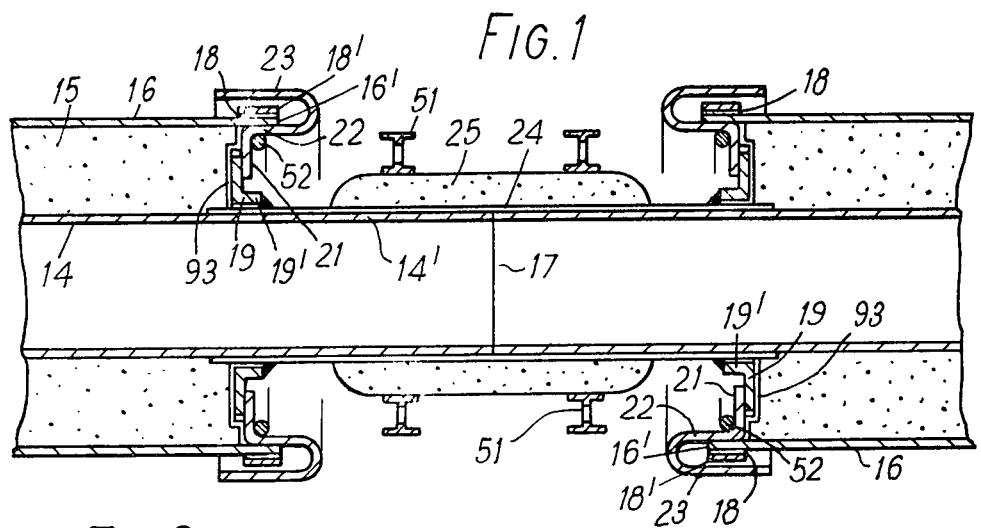

United States Patent [19]

Sigmund

[11] 4,162,093

[45] Jul. 24, 1979

[54] HEAT-INSULATED PIPE-LINES

[76] Inventor: Frantisek Sigmund, 19 rue du Calvaire, 92210 Saint-Cloud, France

[21] Appl. No.: 806,288

[22] Filed: Jun. 13, 1977

[30] Foreign Application Priority Data

Jun. 14, 1976 [GB] United Kingdom ............... 24605/76

[51] Int. Cl.$^2$ ............................................. F16L 59/16
[52] U.S. Cl. ..................................... 285/47; 138/114; 138/149; 285/97; 285/138; 285/294; 285/DIG. 5
[58] Field of Search ....................... 285/47, 48, 49, 50, 285/51, 52, 53, 54, 138, 97, DIG. 5, 294; 138/112, 113, 114, 149

[56] References Cited

U.S. PATENT DOCUMENTS

| | | | |
|---|---|---|---|
| 2,857,931 | 10/1958 | Lawton | 285/55 |
| 2,930,407 | 3/1960 | Conley et al. | 138/114 |
| 3,473,824 | 10/1969 | Daniels | 285/97 X |
| 3,854,756 | 12/1974 | Couch | 285/47 |
| 4,019,761 | 4/1977 | Heidemann | 285/47 |

FOREIGN PATENT DOCUMENTS

| | | | |
|---|---|---|---|
| 941404 | 2/1974 | Canada | 285/47 |
| 2241655 | 3/1973 | Fed. Rep. of Germany | 138/149 |
| 556010 | 9/1943 | United Kingdom | 285/97 |
| 1335055 | 10/1973 | United Kingdom | 285/53 |

*Primary Examiner*—Dave W. Arola
*Attorney, Agent, or Firm*—Blanchard, Flynn, Thiel, Boutell & Tanis

[57] ABSTRACT

For use in heat-insulated pipe-lines produced from at least two heat-insulated pipe units joined end to end, each heat-insulated pipe unit consisting of a pipe surrounded over the greater part of its length by at least one layer of heat-insulating foam material which is in turn enclosed by an outer jacket of fluid-impervious protective material, the end parts of the pipe projecting beyond the corresponding ends of the layer or layers of heat-insulating material and the end parts of the jacket projecting likewise but for a shorter distance, so that annular recesses are formed in the ends of the pipe unit. The pipes of these two pipe units are interconnected end to end by a butt weld or mechanical jointing element between the projecting end parts thereof. Annular seals of rubber-like material are located in the annular recesses in the proximate ends of the two pipe units. A tubular cover extends across the gap between the proximate end parts of the jackets of the two pipe units in spaced coaxial relationship with the interconnected pipe end parts. The annular space or spaces enclosed by the seals and the cover and surrounding the interconnected pipe end parts are filled with heat-insulating foam material.

24 Claims, 9 Drawing Figures

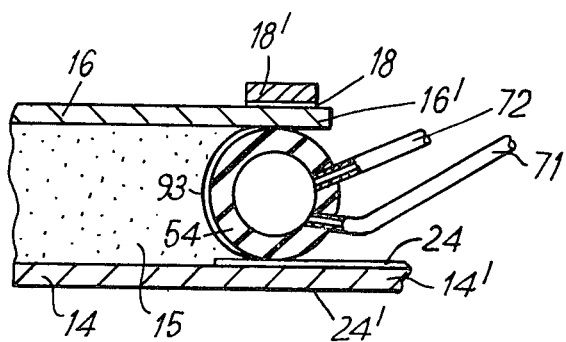
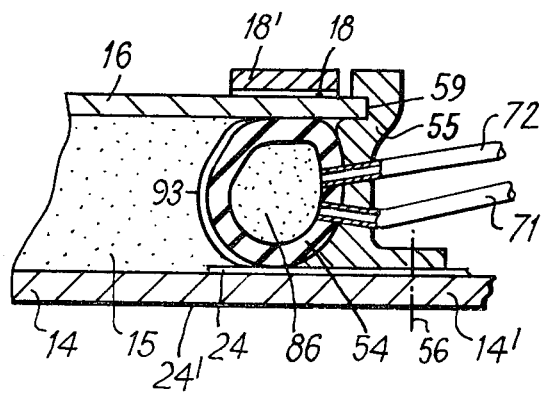
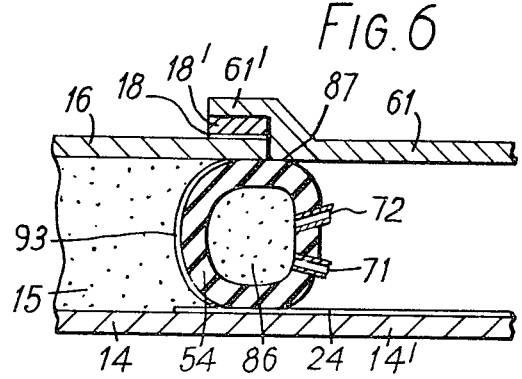

HEAT-INSULATED PIPE-LINES

This invention is concerned with improvements in or relating to heat-insulated pipe-lines produced from at least two heat-insulated pipe units joined end to end, the said pipe units being of the kind which consists of a pipe surrounded over the greater part of its length by at least one layer of heat-insulating foam material which is in turn enclosed by an outer jacket of fluid-impervious protective material, the end parts of the pipes projecting beyond the corresponding ends of the layer or layers of heat-insulating material and the end parts of the jackets projecting likewise but for a shorter distance, so that annular recesses are formed in the ends of the pipe unit. Such pipe units will be hereinafter designated "pipe units of the kind referred to".

The invention is concerned primarily with improvements in heat-insulated joints between pipe units of the kind referred to, but also includes improvements in the pipe units and pipe-lines as well as an improved method of producing such pipe-lines.

The pipe-lines according to this invention may be laid in a trench and covered with earth, or may be submerged in water or may be supported above ground. In some cases, e.g. in the case of a pipe-line used for conveying heavy fuel oils, efficient heat-insulation is necessary to maintain the fuel oil at a temperature above that of the atmosphere and in other cases, e.g. in the case of a pipe-line used for conveying a liquefied gas, efficient heat-insulation is necessary to maintain the liquefied gas at a very low temperature. The effectiveness of the heat-insulation surrounding the metal pipes is, however, liable to be greatly impaired if liquid or vapour is able to penetrate into it. Such penetration, which may also result in corrosion of the pipes, can occur at joints between the jackets of adjoining insulated pipe units and the covering surrounding the heat-insulating layer over the joint between their pipe end parts, and is particularly likely to do so in parts of a pipe-line which are subjected to the action of substantial external hydrostatic pressure, e.g. in the case of a pipe-line submerged in water.

The pipe of each pipe unit of the kind referred to may be metallic. The layer of heat-insulating material may be composed of any micro-cellular foam material, such as polyol isocyanurate, polyurethane, phenolic foam or styrene foam, applied either by injection or spraying. The outer jacket may be composed of a thermoplastic elastomer, such as polyethylene, PVC, rubber-like compounds, butyl or styrene compounds reinforced with fibreglass or nylon, or bitumastic compounds similarly reinforced.

It is already known to fill the annular gap around the joint between the pipes of each pair of interconnected pipe units in a pipe-line with a foam-forming heat-insulating material and then, after this filling has hardened and has been coated with a layer of mastic, to cover the mastic-coated filling and the marginal end parts of the jackets of the adjacent pipe units with a sleeve of thermoplastic material, such as cross-linked polyethylene, which sleeve is subsequently shrunk on so that its inner surface is in tight sealing engagement with the other surface of the mastic coating. This sleeve, before being slid onto one of the pipe units, is heated, expanded in diameter and then cooled so as to impart to it the required shrinkage characteristics. After having been treated in this manner, the sleeve is slid over one of the pipe units to a position in which it is set back from the abovementioned annular gap and remains in this position until after the mastic coating has been applied over the heat-insulating filling. It is then slid axially along the corresponding pipe unit to a position in which it completely covers the mastic-coated filling as well as the marginal end parts of the jackets of the adjacent pipe units. In this position, the sleeve is heated with a gas flame so that the "memory" of the cross-linked material causes the sleeve to shrink to its original diameter with the result that it is a close fit around the mastic-coated filling and the adjoining end parts of the jackets of the pair of interconnected pipe units.

A disadvantage of this known method is that the sleeve has to be relatively thin and consequently, after being shrunk on, cannot exert sufficient force to provide, between it and the jackets of the pipe units, mechanical connections which are adequate to ensure the maintenance of effective seals between the said sleeve and the said jackets. It will be appreciated that, when the pipe-line is anchored at intervals along its length, the portions thereof between any two proximate anchoring points can undergo a certain amount of relative movement. Moreover, when the pipe-line is lying in a trench before the latter has been filled in, the overlapping joints between the jackets of the pipe units and the sleeve, on being exposed to radiant heat from the sun, will become loosened so that water, gas or moisture from the outside will be able to penetrate into the insulating layer surrounding the joint between the pipe ends. Moreover, the sleeve, being rather thin, is liable to be perforated by sharp stones pressing against it, so that once again water, gas or moisture will be able to penetrate into the insulating layer.

This invention includes among its objects the provision of improvements in heat-insulated joints between pipe units of the kind referred to, whereby the abovementioned disadvantages are avoided.

With this object in view, the invention provides a heat-insulated joint between two pipe units of the kind referred to, wherein the pipes of these two pipe units are interconnected end-to-end by a butt weld or mechanical jointing element between the projecting end parts thereof; annular seals of rubber-like material are located in the annular recesses in the proximate ends of the two pipe units, each annular seal having an outer circumferential portion lying in contact with the radially inner surface of the projecting end part of the jacket of the respective pipe unit and an annular end portion lying in contact with an annular seating on at least the radially outer part of the end face of the respective pipe units; a tubular cover extends across the gap between the proximate end parts of the jackets of the two pipe units in spaced coaxial relationship with the interconnected pipe end parts; and the annular space or spaces enclosed by the seals and the cover, and surrounding the interconnected pipe end parts, are filled with heat-insulating foam material, in the outer circumferential portions and the annular end portions of the annular seals being held in fluid-tight sealing contact respectively with the radially inner surfaces of the projecting jacket end parts and with the seatings on the end faces of the corresponding pipe units.

Preferably, the density of the expanded foam material within each annular seal is made higher than it would otherwise be by injecting into a space enclosed or partly enclosed by the said circumferential part of the annular seal an excess quantity of foam-forming heat-insulating material, so that a correspondingly high pressure will be exerted by the filling formed therefrom on the radially inner surface of the corresponding end part of the jacket of the pipe unit, after the said filling has hardened. It will be appreciated that this high pressure will result in a correspondingly effective fluid-tight seal. For example, the foam fillings within the annular seals may consist of a so-called hard foam having a density of from 40 kg/m$^3$ to 200 kg/m$^3$, or even a so-called structural foam having a density of 400 kg/m$^3$ or more. Any given required pressure can of course be obtained by suitably adjusting the amount of excess foam-forming material which is injected.

The seatings for the annular end portions of the annular seals are advantageously provided on linings of rubber-like or thermosetting material covering the end faces of the heat-insulating foam layer and having their inner and outer edges sealed to the pipe and jacket respectively of the pipe unit. These linings may consist of prefabricated fibre-or filament-reinforced collars or of coatings formed by spraying or brushing a solution of rubber-like material over the end faces of the heat-insulating foam layer. When the foam material within the annular seals is expanded, these linings of rubber-like material are compressed between the annular end portions of the respective seals and the respective end faces of the foam layers of the pipe units.

The provision of such linings on the end faces of the heat-insulating foam layers of the pipe units has an important advantage, as compared with prior art arrangements in which the end parts of the pipe unit jackets are extended radially inwardly over the said end faces as far as the metal pipes, in cases where the pipe units concerned are incorporated in a pipe-line for the conveyance of fluids at high temperatures, e.g. oil at 90° C. At such high temperatures, materials such as polyethylene which are commonly used for the pipe unit jackets soften as do most thermoplastic materials, other than silicones which are expensive. The provision of the abovementioned linings, however, enables the end parts of the pipe unit jackets to be maintained at a temperature which can cause them no damage. At the same time, since the total amount of material required for the production of these linings is very small compared with that required for the production of the pipe unit jackets, the linings can be made of materials, such as silicones or thermosetting compounds, which suffer no damage at the temperatures to which they are liable to be exposed when, for example, the pipe units are incorporated in a pipe-line used for conveying heavy hot oil.

The seals provided in the annular recesses in the ends of each pipe unit may be constituted by composite or integrally formed rings of substantially U-section with the part forming the base of each U seated against the lining on the corresponding foam layer end face and the parts forming the two main limbs of the U being disposed parallel to the surfaces of the respective projecting pipe and jacket end parts. Alternatively, they may consist of integrally formed hollow rings.

A preferred form of composite U-section seal has a flexible radially outer annular part and a relatively stiff fibre-or filament-reinforced inner annular part, the outer annular part being joined and sealed to the inner annular part. The inner part of this composite seal has an annular end portion which lies against the radially inner part of the annular seating on the end face of the respective heat-insulating foam layer of the respective pipe unit and an annular flange on the radially inner edge of this annular end-portion, which flange is secured and sealed to the corresponding pipe end part of the respective pipe unit, while the outer part has an inturned flange which lies against the radially outer part of the seating on the end face of the respective heat-insulating foam layer of the respective pipe unit and an outer tubular wall part which constitutes the said outer circumferential portion of the seal and lies against the radially inner surface of the respective projecting jacket end part of the respective pipe unit.

In cases where the annular seals are constituted by hollow rings, separate fillings of heat-insulated foam material can be provided, respectively in the spaces within these hollow rings and in a further space enclosed by the cover and located at least partly between the outer surface parts of these hollow rings.

Whether the annular seals have the form of composite or integrally formed substantially U-section rings or of integrally formed hollow rings, they are advantageously formed with extensions in the form of sleeve parts, the extensions on each pair of seals on opposite sides of a joint between two pipe units extending towards each other from the outer circumferential portions of the respective seals and forming parts of the cover over the joint. Preferably, the proximate ends of these extensions are separated by an annular gap and an intermediate sleeve, constituting a further portion of the cover, is positioned over the sleeve parts so as to bridge said gap and is secured and sealed to the outer surface portions of the sleeve parts bordering said gap.

At least part of the heat-insulating foam material in the annular space or spaces enclosed by the seals and the cover and surrounding the interconnected pipe end parts may be a high density foam material produced by injection into the said space or spaces of at least 120 kg/m$^3$ and preferably more than 150 kg/m$^3$ of foam-forming material.

In cases where the annular seals consist of hollow rings of rubber-like material, the annular end faces of the heat-insulating foam layers of the pipe units may be of concave cross-section and the outer surfaces of the annular end portions of the seals of a complementary convex cross-section.

In other cases, the annular seatings may be provided on radially outer parts of the end faces of the heat-insulating foam layers of the pipe units or on the radially outer parts of linings on these end faces, which radially outer parts are recessed with respect to the radially inner parts of said end faces or linings so that an annular step is provided between said radially outer parts and said radially inner parts, the annular seals being located wholly or mainly within said recessed radially outer parts. The recessed radially outer parts of the end faces or linings in such cases preferably have a radial width substantially smaller than that of the radially inner parts of said end faces or linings. With this arrangement the annular seals are located in zones which are maintained substantially at ambient temperature even when fluids at high or cryogenic temperatures are being conveyed through the pipes of the respective pipe units.

The projecting end parts of the jackets of the pipe units are advantageously surrounded by reinforcing collars with the interposition of gaskets of flexible or plastified rubber-like material, so that, when the seals are expanded against the radially inner surfaces of the projecting end parts of the pipe unit jackets, these projecting end parts will be resiliently supported on the outside due to the compression of the gaskets between then and the reinforcing collars.

The heat-insulating foam material in the space enclosed by the cover may comprise a plurality of prefabricated segments of said material assembled around the interconnected pipe end parts in the form of a segmental tube and a tubular body of injected foam material between the outer surface of said segmental tube and the inner surface of the cover, in which case a layer of rubber-like material is preferably provided between the inner surface parts of the tubular body of injected foam material on the one hand and the outer circumferential surface and end surfaces of the segmental tube on the other hand, the ends of said film being connected to the radially inner edges of the seatings on the end faces of the pipe units by coatings of like material on the outer surface parts of the pipe end parts between said film and the seatings on said end faces. These coatings not only make each segment fluid-tight but also, being resilient, allow for expansion and contraction of the segments relative to the pipe end parts and the body of injected foam material, irrespective of whether the heat-insulating foam material in the annular space around the interconnected projecting pipe end parts includes or does not include such a segment tube. It is desirable that these projecting pipe end parts should be coated with a thick film of rubber-like material, the ends of which adjoin and are sealed with respect to linings arranged as mentioned above on the end faces of the heat-insulating foam layers which are located on each side of the joint between these pipe end parts. This thick film of rubber-like material not only forms a fluid-tight barrier between the heat-insulating foam around the joint and the interconnected pipe end parts, but also allows for relative expansion and contraction between the interconnected pipe end parts and the heat-insulating foam.

In cases where the seals are hollow rings without extensions, part of the outer circumferential of each seal on each side of the completed joint preferably extends beyond the end edge of the projecting end of the respective pipe unit jacket so as to provide a substantially cylindrical seating for the corresponding end part of the cover.

In joints between pipe units having a plurality of layers of heat-insulating foam material between the pipes and jackets thereof, the heat-insulating foam material, surrounding the interconnected pipe end parts of said pipe units and enclosed by the seals and cover of the joint, may comprise a corresponding plurality of coaxial heat-insulating foam layers, including an inner layer consisting of a tubular assembly of prefabricated segments of heat-insulating foam material with hollow rings of rubber-like material filled with heat-insulating foam material located between its ends and the corresponding seatings or linings on the radially inner parts of the end faces of the heat-insulating foam layers of the pipe units; at least one intermediate layer likewise consisting of a tubular assembly of prefabricated segments of heat-insulating foam material, each segment being coated over its entire surface area with a covering of rubber-like material which is thicker at the ends of the segments than on the inner, outer and longitudinal mating surfaces thereof; and an outer layer of injected or moulded heat-insulating foam material enclosed by the cover and located between the seals which are held in fluid-tight sealing contact with the radially inner surfaces of the projecting end parts of the pipe unit jackets. In joints so constructed the density of the outer layer of heat-insulating foam material surrounding the joint may be greater than that of the corresponding intermediate layer and the density of the intermediate layer may be greater than that of the corresponding inner layer. By this means the outer layer is given greater compression strength than the or each intermediate layer and the latter in turn is given greater compression strength than the inner layer.

In such pipe units provided with a plurality of heat-insulating foam layers, the ends of each successive heat-insulating foam layer, in the radially outward direction, may be set back with respect to the corresponding ends of the adjoining heat-insulating foam layer within it, the corresponding annular portions of the respective collars being likewise set back with respect to one another, so as to form a series of annular steps and each successive layer of the heat-insulating foam layers surrounding the interconnected pipe unit end parts beng longer than the adjoining heat-insulating foam layer within it and havig its ends supported directly or indirectly on a corresponding one of said anular steps. The stepped ends of the layers preferably support correspondingly stepped linings.

Advantageously, a tubular separator formed with annular corrugations is provided between the innermost layer of the heat-insulating layers surrounding the interconnected pipe end parts and the adjoining heat-insulating layer surrounding it, the end parts of this separator being seated on parts of the outer surfaces of the hollow rings of rubber-like material. A further tubular separator may be provided between the outer-most layer of the heat-insulating foam layers surrounding the interconnected pipe unit end parts, with its end parts secured and sealed both to the tread portions of the outermost annular steps of the linings on the ends of the proximate pipe units and to the radially inner parts of the respective seals.

The or each such tubular separator forms a fluid-tight barrier against penetration of moisture in the direction from the outside towards the pipe of the pipe unit.

In order to accommodate relative axial and angular movements of the interconnnected pipe units, due to expansion and contraction thereof caused by changes in temperature, the interconnected pipe unit end parts may have a bellows element welded between them.

Another preferred feature, in joints designed for cryogenic applications, is that the proximate pipe end parts of the two pipe units on each side of the joint are interconnected by a bellows element. Such a bellows element can accommodate not only relative axial elongation and contraction of the pipe units connected thereby, but also relative angular movement such as are produced at a bend in pipe-line by expansion and contraction of the pipes thereof caused by changes in temperature.

A pipe-line according to this invention may consist of at least two pipe units of the kind referred to, interconnected end-to-end by a heat-insulated joint according to this invention.

The invention also includes a pipe unit of the kind referred to, in which there is arranged in each of the annular recesses thus formed in the ends thereof, between the corresponding projecting end parts of the pie and the jacket, an annular seal of rubber-like sheet material lying in surface-to-surface contact with at least the radially outer part of a seating located on the corresponding end face of the heat-insulating foam layer and an outer circumferential part which is adapted to be held in tight sealing contact with the radially inner surface of the corresponding projecting end part of the jacket by heat-insulating foam material, when such material has been introduced within said circumferential part and has undergone expansion. Each such seating is preferably provided on a lining of rubber-like material covering the corresponding end face of the heat-insulating foam layer of the pipe unit and having its inner and outer edges sealed to the pipe and pipe jacket respectively of the pipe unit. These linings may consist of prefabricated fibre- or filament-reinforced collars or of coatings formed by spraying or brushing a solution of rubber-like or thermosetting material over the end faces of the heat-insulating foam layer. The outer surfaces of the projecting pipe end parts are also advantageously coated with a thick film of rubber-like material which joins and is sealed with respect to the inner edge of the corresponding lining.

The seals in the ends of the pipe unit may be of any of the three kinds mentioned above in connection with the joint. If they consist of composite or integrally-formed substantially U-section rings, they may be fitted and temporarily secured, e.g. by spring rings, in the annular recesses in the ends of the pipe units before the said pipe units leave the factory. If they consist of hollow rings, they may not merely be fitted in the factory, but also filled there with heat-insulating foam material which is allowed to expand and harden while the said units are still in the factory, ao that outer circumferential parts of the seals are held thereby in fluid-tight sealing contact with the radially inner surfaces of the corresponding end parts of the pipe unit jackets.

More particularly in the case of pipe units intended for cryogenic applications, a plurality of coaxial heat-insulating foam layers may be provided between the pipe and jacket of each pipe unit, and the ends of each successive heat-insulating foam layer of each pipe unit, in the radially outward direction, may be set back with respect to the corresponding ends of the adjoining heat-insulating foam layer within it, the corresponding annular portions of the respective linings being likewise set back with respect to one another, so as to form a series of annular steps, and each of the heat-insulating foam layers except the innermost one having its ends supported on a corresponding one of said annular steps.

Also, in a pipe unit having a plurality of coaxial heat-insulating foam layers, a layer or sleeve composed of a rubber-like or rigid material may be provided between each such foam layer and the or each adjoining foam layer, the or each such layer of rubber-like or rigid material having smooth inner and or outer surfaces so as to permit relative longitudinal sliding movement between said foam layers and the ends of said foam layers.

In order to reduce the adverse effects of friction between the outer surface of a long pipe-line and the soil in which it is laid, it is already known to make use of what is known as "zig-zag planning", e.g. to arrange the pipeline so that each four successive lengths thereof consist of a first length extending in the general longitudinal direction between the ends of the pipe-line, a second length inclined to the first length towards one side thereof, a third length parallel to the first length, and a fourth length inclined towards the other side of the first length and third lengths. Such "zig-zag planning" results in the stresses caused by expansion and contraction of the pipe-line to be taken up mainly at the bends between successive lengths thereof. When laying such pipes, however, further considerable stresses are applied by the pull of the side-board tractor or the like which is used to form the bends in the pipe-lines. In order to enable these further stresses to be accommodated without damage, there is provided, according to another preferred feature of this invention, a pipe unit of the kind referred to wherein annular supports are provided between the pipe and jacket thereof at intervals along the length of said jacket, each annular support comprising a collar of rubber-like material stiffened by an internal reinforcement and mounted on the pipe and an outer annular cushioning ring of low density polyurethane foam material having its inner circumference sealed to the outer circumference of the collar and its outer circumference pressed against the interior surface of the jacket.

A heat-insulated joint between two pipe units of the kind referred to may be produced by the method according to this invention which comprises the steps of inserting annular sealing elements in the annular recesses in those ends of the pipe units which are to be joined, with a circumferential portion of each sealing element in contact with the inner surface of the corresponding projecting end part of the jacket of the respective pipe unit; interconnecting the projecting end parts of the pipes at the said ends of said pipe units by forming a butt weld between said projecting pipe end parts, or butt welds between each of them and a corresponding end of a hollow jointing element, such as a bellows element; forming, in the annular space or spaces around the interconnected pipe end parts and between the corresponding pipe unit end parts provided with said sealing elements, a filling or fillings of heat-insulating foam material, at least the radially outer part of the or each of the fillings, including the parts thereof surrounded by the circumferential portions of the sealing elements, being formed by injection of a foam-forming material; causing or allowing said foam-forming material to expand and harden, while the gap between the proximate projecting jacket end parts is closed by a mould or tubular outer support, so that the outer circumferential portions and the annular end portions of the sealing elements are held in fluid-tight sealing contact with the radially inner surfaces of the projecting jacket end parts and with seatings on the end faces of the foam layers of the corresponding pipe units; and forming or positioning an outer tubular cover of fluid-impervious protective material, so that it extends in coaxial relationship with the interconnected pipe end parts, across the gap between the proximate projecting jacket end parts of the pipe units and is sealed with respect to the extremities of said jacket end parts.

Preferably, an excess quantity of foam-fomring heat-insulating material is injected into said annular space or spaces, so that the density of tne foam material, after expansion and hardening, is greater than if no such excess quantity of material had been injected and a correspondingly high pressure is exerted by the expanded foam material on the radially inner surfaces of the outer circumferential portions of the corresponding projecting end parts of the jackets of the pipe units.

Prior to the insertion of the annular sealing elements, annular lining members of rubber-like material are advantageously applied over the end faces of the pipe units, and the inner and outer edges of said sealing elements are sealed to the jackets and pipes respectively of the corresponding pipe units.

In one form of the method according to this invention, which makes use of hollow sealing rings without extensions, after these rings have been filled with foam-forming material and the fillings have hardened and expanded, terminal portions of the projecting end parts of the jackets and corresponding portions of any external reinforcements and gaskets provided on them are cut away to expose substantially cylindrical circumferential parts of the sealing rings which are subsequently used as seatings for corresponding end parts of the outer cover.

In cases where the sealing rings are hollow, the hollow spaces within them are preferably filled in a preliminary operation with foam-forming heat-insulating material which is denser than that of the main filling of heat-insulating foam material which is formed subsequently.

In cases where the sealing rings are not hollow, the annular recesses in the ends of the interconnected pipe units are preferably filled with foam-forming, heat-insulating foam material in a preliminary operation while the sleeves are folded back over the envelopes of the respective pipe units, the mouths of the annular recesses having been closed off by removable moulds provided with filling openings and air vents The fillings of foam-forming, heat-insulating material so formed in the annular recesses are once again preferably denser than the main filling formed subsequently in the remaining annular space between these fillings.

Figure 2:
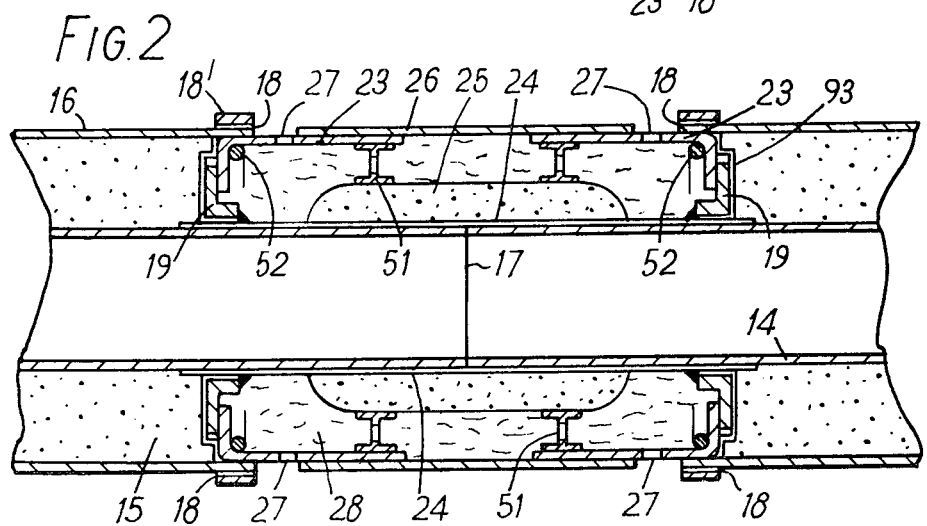
Figure 3:
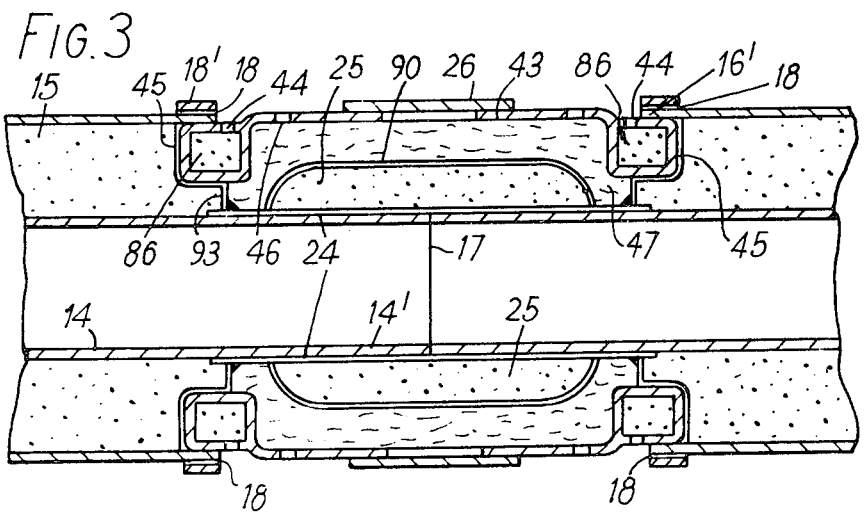
Figure 7:
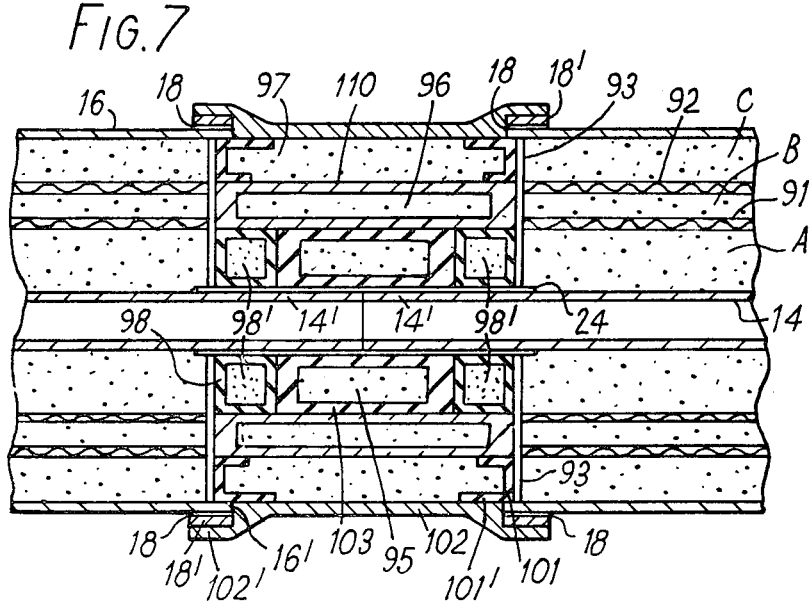
Figure 8:
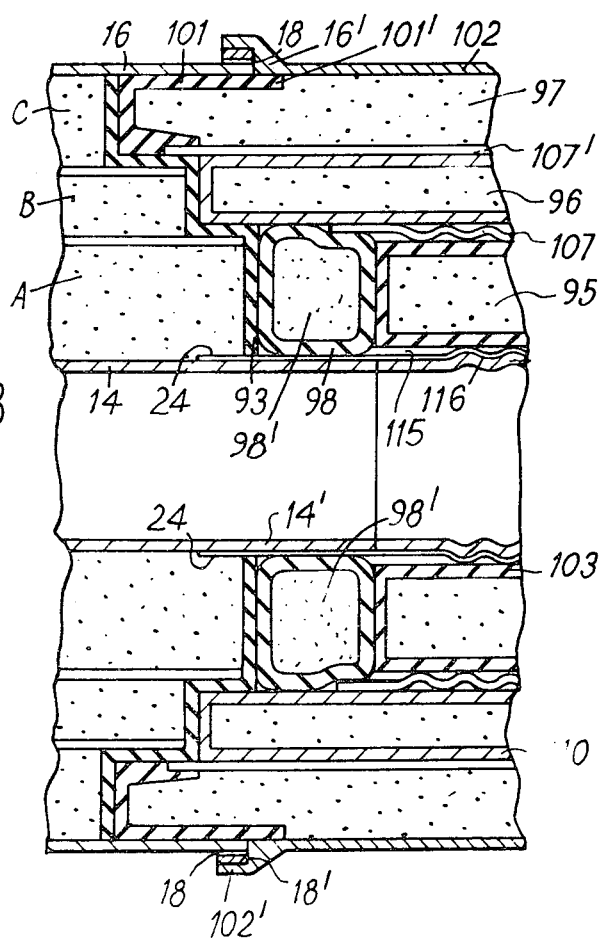
Figure 9:
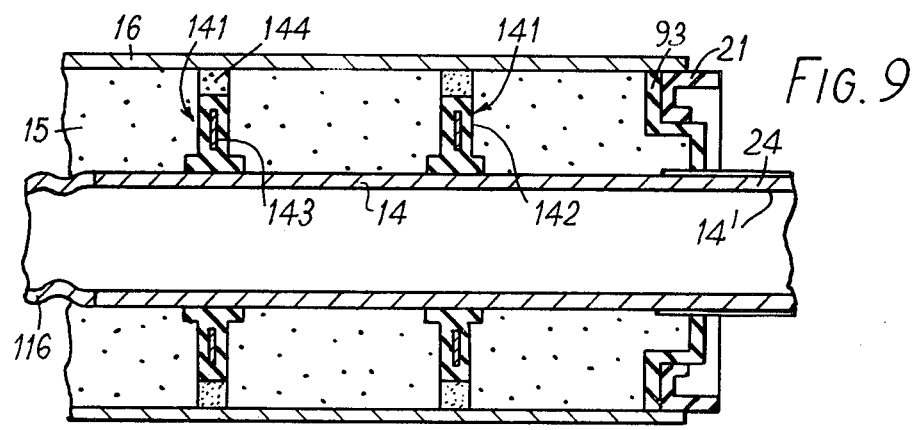

This invention will now be described, by way of example, with reference to the accompanying diagrammatic drawings, in which:

FIG. 1 is a diagrammatic longitudinal section, partly broken away, of a partly completed joint between two heat-insulated pipe units, FIG. 2 is a fragmentary longitudinal section of the finished heat-insulated pipe unit joint, FIG. 3 is a fragmentary longitudinal section corresponding to FIG. 2 of another form of heat-insulated joint, FIGS. 4, 5 and 6 are fragmentary longitudinal half sections illustrating three successive stages in the formation of a further form of heat-insulated joint, FIGS. 7 and 8 are fragmentary longitudinal cross sections of still further forms of joint, and FIG. 9 is a fragmentary longitudinal section illustrating a heat-insulated pipe unit provided with annular supports between the metal pipe and outer jacket thereof.

Referring to FIGS. 1 and 2, each of two heat-insulated pipe units which are to be joined together by a heat-insulated joint comprises a metal pipe 14 surrounded for the greater part of its length by a layer 15 of heat-insulating foam material having a density of approximately 60 kg/m³, which layer 15 is in turn surrounded by a jacket 16 of fluid-impervious protective material. The end part 14' of each pipe 14 projects beyond the corresponding ends of the foam layer 15 thereof, and the end parts 16' of the jacket 16 project likewise, but for a shorter distance. Thus, annular recesses are provided in the ends of each pipe unit between projecting end parts 14' and 16' of the pipe 14 and the jacket 16 thereof. The base of each such recess is provided with a lining 93 composed of a rubber-like material or of a fibre-reinforced polyester or epoxy compound. In addition, the projecting pipe end parts 14' and the directly adjoining parts of the pipe 14 surrounded by the end parts of the foam layers are coated with thin films of an anti-corrosive material which is compatible with the material of the linings 93. Rubber-like coatings 18 are provided on the outer surfaces of the projecting jacket end parts and these coatings 18 are enclosed by collars 18' of fibreglass-reinforced epoxy or polyester resin. The rubber-like coatings are composed of a silicone or other compatible compound and may be applied by spraying or in the form of silicone tapes wound round the jacket end parts 16'.

The annular recesses in the ends of the pipe units serve for the reception of seals which will form part of the joint between each adjacent pair of pipe units. The seals in the embodiment according to FIGS. 1 and 2 are prefabricated composite U-seals, each of which consists of a radially inner part in the form of a fibreglass-reinforced epoxy or polyester ring 19, having an axially extending flange on its radially inner edge, and a radially outer part of rubber-like material which is joined to the outer margin of the ring 19, e.g. by means of an adhesive or by heat and pressure welding, and is provided with an extension in the form of a sleeve part 23. The seals may alternatively be composed of a styrene-butadiene compound.

When such a seal is fitted in a corresponding annular recess in the end of a pipe unit, the ring 19 lies close against the radially inner part of the lining 93, while its annular flange 19' fits closely around the respective pipe unit end part 14' and is secured to the latter by means of a rubber-like adhesive. At the same time, an annular end portion 21 of the radially outer part of this seal lies close against the radially outer part of the lining 93, a circumferential portion 22 thereof lies close against the inner surface of the corresponding projecting end part 16' of the respective pipe unit jacket 16 and the extension 23 thereof is folded back over the outside of the said projecting end part 16'.

The rings 19 forming the radially inner parts of these seals may be moulded with a fibreglass or nylon mesh reinforcement incorporated therein. Alternatively, they may be produced from a polyester or epoxy fibreglass-reinforced board material dipped in or sprayed with a rubber-like solution or having a rubber-like material applied over its entire surface.

The production of the pipe units and the fitting of the prefabricated seals in the annular recesses in their ends are carried out in a factory, as follows. First, the anti-corrosion films, which will subsequently form parts of the coating 24, are applied to the end parts 14' of each pipe 14. Next, ring moulds (not shown), each consisting of two separable mould parts, are attached by screws to the two projecting pipe end parts 14' respectively of each pipe 14 in positions corresponding to those which will subsequently be occupied by the linings 93. Heat-insulating foam-forming material is now sprayed over the whole length of the pipe 14 between the two moulds until a foam layer 15 of the required density and outside diameter has been formed.

After the foam layer 15 has hardened, the moulds are removed and the end faces of the said layer 15 are provided with the linings 93. These linings preferably consist of prefabricated pressure-moulded collars composed of a polyester or epoxy material reinforced with fibreglass, which collars are slid over the projecting pipe end parts 14' and bonded to the end faces of the layer 15. Alternatively, they may be formed by brushing or spraying a rubber-like material over the said end faces.

If the linings 93 are in the form of collars, the joints between the radially inner edges of these collars and the coated projecting pipe end parts 14' are treated by spraying or brushing them with rubber-like material so as to seal them in a fluid-tight manner.

Then, after the outer jacket 16 has been formed by moulding or otherwise around the heat-insulating foam layer 15 of each pipe unit, the outer surfaces of the projecting end parts 16′ thereof are provided with the coatings 18 of rubber-like material, e.g. by spraying or applying silicone rubber tapes around them, which coatings will form resilient flexible gaskets between the jacket end parts 16′ and the collars 18′ which are subsequently fitted over the said coatings 18.

The collars 18′ are provided in order to prevent the projecting end parts 16′ of the pipe unit jacket from becoming distorted or damaged by pressure exerted on their inner surfaces by the circumferential portions 22 of the seals during subsequent jointing of the pipe units.

The foam layer 15 of each pipe unit, instead of being applied as described above by spraying prior to being enclosed by the jacket 16, may be formed by injecting thermoplastic foam-forming material through a hole or holes in the jacket 16 which has been previously positioned over skeleton spacers (not shown) previously attached to the pipe at intervals along its length.

Before the pipe units are removed from the factory to the installation site, the seals 19, 21, 22, 23 are inserted into the annular recesses in their ends and the joints between the flanges 19′ and the anti-corrosion films on the projecting pipe end parts 14′ are sealed with rubber-like elastomeric material which is compatible with the materials of the said films and of the rings 19. Then steel spring rings 52 are positioned as shown in FIGS. 1 and 2 within their circumferential portions 22, so as to retain these portions 22 and the annular end portions 21 in position during transport of the pipe units to the installation site and subsequent formation of the joints between them. The extensions 23 of the seals are also bent outwardly and back over the jacket end parts 16′, as shown in FIGS. 1 and 2, to facilitate the subsequent joint-forming operations.

After the pipe units have been transported to the installation site and laid end-to-end, they are joined together by forming butt welds 17, between the extremities of the projecting end parts 14′ of each adjoining pair of pipe units. Rubber-like material is then applied over the joint region to repair the damage caused by the welding operations to the anti-corrosive coating on the projecting pipe end parts 14′, thereby completing a continuous film layer 24, shown in FIGS. 1 and 2. Then, two prefabricated half tubular parts 25, composed of a heat-insulating foam material, are assembled over the film 24 and held together, e.g. by adhesive tape. Prior to such assembly of the half tubular parts 25, the inner surfaces and mating longitudinal edge surfaces of the latter are wetted with rubber-like adhesive and the outer surface of the film 24 is likewise wetted.

Next, after skeleton supporting rings 51 have been fitted over the half tubular parts 25, the extensions 23 are pulled towards each other over these rings 51 and an outer flexible cover 26 consisting of a sheet of rubber-like material or a styrene resin compound is positioned so that it bridges the gap between the proximate ends of the extensions 23. Then, this cover sheet 26 is joined and sealed to the extensions 23 by means of a rubber-like adhesive or is welded or cemented to the extensions 23. After this operation, an outer support (not shown), composed of PVC, is fitted over the joint region of the two pipe units.

The support may consist of two PVC sheets wrapped round the cover formed by the cover 26 and the extensions 23 of the seals and secured, e.g. by means of adhesive tape, so as to hold these parts in shape during the subsequent injection of foam-forming material. The sleeve parts 23 are provided with injection openings 27 as well as air escape vents (not shown) and corresponding openings and vents are provided in the support. After the support has been positioned, the constituent of a foam-forming, heat-insulating material are injected through the openings in the support and through the injection openings 27 into the hollow annular space enclosed by the extensions 23 and the outer cover 26 to form a hard foam filling 28 having a density of for example 200 to 250 kg/m$^3$. These constituents, which may consist of low molecular weight polyols and three or more polymeric isocyanates, react together within the said hollow space and, after cooling and hardening, form an expanded foam layer 28 having a high proportion, e.g. 90%, of closed cells.

After the hollow annular space around the half tubular parts 25 has been filled with an excess of quantity of foam-forming material to obtain the desired density and it has expanded both radially and longitudinally, it starts to exercise a very high pressure. The injection openings 27 and the air openings are now closed by means of stoppers in order to allow the foam-forming procedure to achieve the required density. The stoppers are then removed and the holes 27 and air vents are permanently sealed by means of a solution of rubber-like adhesive or are heat-sealed. This radial and longitudinal expansion of the material 28 is permanent, i.e. it is retained after the foam material has cooled and hardened. The annular end portions 21 of the seals are thus engaged tightly against the radially outer parts of the linings 93 in the bases of the annular recesses in the ends of the pipe units and the circumferential portions 22 are held tightly against the inner surfaces of the projecting end parts 16′ of the pipe unit jackets 16. Also, the rubber-like gaskets 18 are compressed between the collars 18′ and the jacket end parts 16′. All joints through which moisture could otherwise penetrate from the outside into the filling of heat-insulating material 28 or from the latter into the heat-insulating layers 15 of the pipe units are thus reliably sealed. The support is then removed.

The abovementioned support (not shown), instead of being formed of a sheet of PVC wrapped round the cover sheet 26 and the extensions 23 of the seals and secured by tapes or the like, may consist of a helically wound strip of PVC, in which case it need not be formed with injection holes, since injection can be effected through the gaps between adjoining turns of the helically wound strip.

In an alternative procedure for forming the foam filling 28, the supporting rings are dispensed with and a mulit-part metallic mould (not shown) is assembled around the joint.

The end parts of this mould, which is longer than the distance between the extremities of the folded back extensions 23 of the seals on each side of the joint, fit closely round parts of the jackets 16 which are located beyond the said extremities in directions away from the welded joint 17. Portions of this mould surrounding the extensions 23 of the two seals are of suitably enlarged diameter, while the intermediate portion of the mould is of the same diameter as the jacket 16. A filling hole is provided in the wall of this intermediate portion through which the constituents of the foam-forming material are injected to provide the foam filling 28. After the injected foam filling has hardened, the mould is removed, the extensions 23 are pulled towards each other and a cover sheet 26 is positioned so that it bridges the gap between proximate ends of these extensions, this cover sheet 26 being joined and sealed to the extensions 23 as previously described.

The expression "rubber-like material" is used in this specification to include elastomeric materials such as natural rubber, polychloroprene, butyl rubber, silicone compounds, nitrile-based compounds and nitrile PVC compounds (containing for example 40% nitrile, fillers, pigments and a plastifier), copolymers of styrene with butadiene charged with carbon black and a plastifier, as well as other synthetic elastomeric materials. The "adhesives" referred to in this specification are mainly solutions of materials such as those mentioned above. In certain cases, however, thermosetting-based adhesive such as styrene, epoxy or acrylic adhesives may be used, as well as non-solvent adhesives, anaerobic adhesives and hot melt adhesives, the latter consisting essentially of a polymeric sandwich formed with polystyrene at each end and polyisoprene or polybutadiene in the middle. The hot melt adhesives flow when heated, but set in a few minutes upon cooling.

The pipe units and joint shown in FIG. 3 differ from those according to FIGS. 1 and 2 mainly in that the prefabricated composite U-seals 19, 21, 22 and their extensions 23 are replaced by prefabricated O-seals 45, i.e. seals in the form of hollow rings of rubber-like material which are formed integrally with extensions 43. To accommodate these O-seals 45, the radially outer parts of the ends of the form layers are formed with annular recesses and the linings 93 are of correspondingly annular stepped shaped. The O-seals 45 are formed with injection openings 44 and vents (not shown).

The operations carried out in the factory to produce the pipe units are similar to those already described with reference to FIGS. 1 and 2. The operative faces of the two-part ring moulds (not shown) which determine the shapes of the end faces of the foam layers 15 are, however, of an annular stepped configuration corresponding to that of the linings 93 in FIG. 3, and the extensions 43 of the O-seals are not folded back in the factory.

After the pipe units have been transported to the site and laid end-to-end, the adjoining ends of each pair of them are welded together as at 17, and the half-tubular parts 25 are assembled and secured as described with reference to FIGS. 1 and 2. Then after the air vents (not shown) in the walls of the O-seals 45 have been closed by stoppers, the said O-seals 45 are inflated through the openings 44 to a pressure somewhat above atmospheric pressure in order to retain them in their seatings at this stage. These openings 44 are then closed by means of stoppers (not shown). The extensions 43 are now folded back over the projecting end parts 16' of the jackets 16 of the respective pipe units. A mould (not shown) provided with injection openings and air vents, is then placed with its ends over the sleeve parts 43 and tightened by circumferential belts (not shown). Heat-insulating foam material is next injected through the injection openings in the mould to form a heat-insulating foam filling 47 with a high proportion of closed cells. After the foam filling 47 has cooled and hardened, the mould is removed and the external surface of the foam filling 47 is covered by spraying with a thin coating of rubber-like material. Thereafter, the extensions 43 are pulled towards each other, and an outer outer flexible cover sheet 26 is positioned so that it bridges the gap between the extensions 43, and the cover sheet 26 is joined and sealed to the extensions 43 by means of an adhesive or welded.

The openings 44 and the air escape vents (not shown) are next reopened and foam-forming, heat-insulating material is injected through the openings 44 into the interiors of the O-seals 45 and the air displaced thereby is allowed to escape through the air escape vents. The O-seals 45 are thus provided with fillings 86 of a heat-insulating foam material which, after having been expanded and hardened, hold the radially outer parts of the said seals 45 pressed tightly against the inner surfaces of the projecting end parts 16' of the pipe unit jackets 16. These projecting end parts 16' are expanded to the extent permitted by the collars 18', so that the gaskets 18 are tightly compressed between the parts 16' and the collars 18'. Fluid-tight seals are thus formed between the O-rings and the projecting end parts 16' of the pipe unit jackets 16.

To achieve a suitable high pressure, the foam-forming, heat-insulating material used to form the fillings 86 may consist of isocyanates and polyol products in a suitable proportion to ensure that these structural foam fillings 86 have a high proportion of closed cells. The amount of material injected preferably exceeds 400 kg/m$^3$, with a compression strength of 45 kg/cm$^2$ for 430 kg/m$^3$. Thus, with a 95% approximately closed cell formulation, the compression strength of the foam fillings 86 amounts to about 45 kg/cm$^2$ as compared with a compression strength of about 2.5 kg/cm$^2$ in the case of the foam fillings 47 (FIG. 3), the density of which was 50 kg/m$^3$ approximately.

When the foam fillings 86 have hardened and cooled, the injection openings and air vents are again sealed with adhesive tapes or closed by welding sheets of rubber-like material over them or by the insertion of stoppers therein.

The formation of a joint according to yet another embodiment of the invention will now be described with reference to FIGS. 4 and 6. Each of the two pipe units between which this joint is to be formed is generally similar to the pipe units in the embodiment according to FIGS. 1 and 2, except that the end faces of the heat-insulating layers 15 thereof are cut away so as to form annular cavities of part-circular cross-section. These cavities are provided with annular linings 93 of corresponding cross-sectional shape. Into each of the annular cavities in the pipe unit ends is inserted a hollow circular-section sealing ring 54, so that the latter is seated against the respective lining 93. Each of the sealing rings is formed integrally with a tubular hose 71, through which foam-forming material will subsequently be injected into it and with a further tubular hose 72 for the escape of air displaced by the injection of this material. A two-part mould ring 55 is fitted over the pipe end part 14' of the respective pipe unit and secured thereto by screws 56. This mould ring 55 is formed with openings (not shown) through which the injection hose 71 and the air escape hose 72 protrude. The axially outer ends of the gasket 18 and the collar 18' and of the jacket end part 16' seat against the radially outer part of the mould ring 55 which has a recess 59 in which the extremity of the jacket end part 16' engages. Foam-forming material is now injected through the hose 71 into the hollow interior of the sealing ring 54 so as to form a high density, heat-insulating foam filling 86 having a high proportion, e.g. 95%, of closed cells.

During cooling and hardening, this filling 86 expands and thereby presses the walls of the hollow sealing ring 54 into fluid-tight sealing engagement with the lining 93 on the foam layer 15 and with the mould ring 55, as well as against the outer surface of the pipe end part 14' and the interior surface of the jacekt end part 16', which is reinforced externally and maintained circular by the collar 18', since the internal pressure exerted by the expanded foam on the jacket end parts 16' is opposed by resilient external pressure exerted thereon by the gasket 18, as the latter is compressed between the jacket end part 16' and the collar 18'.

The jacket end part 16', instead of being a plain hollow cylindrical extension of the jacket 16 as shown diagrammatically in FIGS. 4 to 6, is preferably shaped so as to provide an annular seating (not shown) of concave curved cross-section for the reception of the radially outer parts of the hollow sealing ring 54, and a corresponding annular external surface part of convex curved cross-section. A raised annular seating portion (not shown) of curved cross-section is also preferably provided on the film layer 24 to support the radially inner part of the hollow sealing ring on the side thereof which is nearer the extremity of the pipe end part 14'. In this case, the shape of the surface of the mould ring 55 on the side thereof facing the hollow sealing ring must be modified accordingly.

The sealing ring 54 can be of a microcellular material, for example, neoprene cellular foam. Neoprene cellular foam is very resilient, and is impervious to fluids. As shown in FIGS. 4 to 6, the thickness of the wall of ring 54 is a substantial portion of the radius of the cross-section of the ring 54, e.g. $\frac{1}{4}$ to $\frac{1}{2}$ of the radius of the cross-section of the ring 54.

When the foam within the hollow sealing ring has hardened, the mould ring 55 is removed and the portions of the corresponding jacket end part 16', gasket 18 and collar 18' which project beyond a plane containing the centre-line of the hollow sealing ring 54 are cut away, so as to expose a cylindrical seating surface 87. The injection hose 71 and air hose 72 are now cut short, as shown in FIG. 6, and sealed. All the above-mentioned operations on the individual pipe units are preferably carried out in the factory.

A pipe end part 14' of the pipe unit which has been fitted with a hollow sealing ring 53, as described above, is then butt-welded on the site to the pipe end part 14' of another pipe unit which has been similarly fitted with a like hollow sealing ring. Alternatively, a bellows element (not show) is welded between the two pipe end parts. Then, after the seating surfaces 87 have been suitably prepared, a mould (not shown) of PVC or steel, generally similar to that used in the formation of the heat-insulated joint shown in FIG. 3, is positioned and secured around these seating surfaces 87 with its ends supported internally by them. Heat-insulating, foam-forming material is now injected into the space enclosed by the mould to form a heat-insulating foam filling (not shown) therein, such injection being carried out as described with reference to FIG. 3 in connection with the formation of the heat-insulating foam filling 47. After the foam material so injected has cooled and hardened, the mould is removed and a liquid polyester or epoxy resin is applied by spraying or brushing over the foam between the two sealing rings 54 so as to form on the outer surface thereof a thin coating similar to the thin coating applied over the foam filling 47 in FIG. 3. This coating not only adheres to the outer surface of the heat-insulating foam material, but also seals the exposed pores thereof. It also provide a firm support for an outer cover 61 which is subsequently applied over it. The outer cover 61, which is preferably composed of a fiberglass-reinforced thermosetting resin compound, such as a styrene, epoxy or acrylic compound, but may alternatively be composed of a rubber-like material, has enlarged end parts 61' which are extended over the collars 18' on the pipe end parts 16' of the two interconnected pipe units, so as to form strong fluid-tight joints. If the outer cover 61 is composed of a rubber-like material, it may be formed by helically winding adhesive tapes of butyl rubber, nitrile PVC or PVC around the film or by wrapping a sheet of such material around it.

The embodiment of the joint according to this invention which is illustrated in FIG. 7 is particularly suitable for use in pipe-lines for conveying fluids at middle cryogenic or geothermic temperatures, since it is capable of accommodating without damage the stresses resulting from the substantial differential expansion and contraction between the butt-welded metal pipe end parts 14' and the outer cover 102 around the joint between each two adjoining pipe units, which will occur particularly between periods during which the pipe-line is being used for the conveyance of a cryogenic or geothermic fluid and periods during which the pipe-line is not in use.

The heat-insulated pipe units to be joined, which are produced in the factory, are generally similar to those of the embodiments previously described, except that the heat-insulating foam material between the pipes 14 and the jacket 16 is in several layers, i.e. an inner layer A, an intermediate layer B and an outer layer C. The intermediate layer B has a density, e.g. 100 kg/m$^3$, which is higher than that, e.g. 50 kg/m$^3$, of the inner layer A, but lower than that, e.g. 200 kg/m$^3$ or more, of the outer layer C. The inner layer A and the intermediate layer B are surrounded respectively by coatings 91 and 92 of rubber-like or silicone material having smooth outer surfaces so as to permit relative longitudinal sliding movement between the three layers A, B and C. The entire end surface betwen the pipe 14 and jacket 16 of each pipe unit is likewisee covered in the factory with a lining 93 of fibreglass-reinforced, rubberlike or silicone material.

The heat-insulating foam material and the joint zone around the butt-joined pipe end parts 14' is likewise arranged in three layers 95, 96, 97 of different densities, e.g. 50, 100 and 200 or more kg/m$^3$, corresponding respectively to the layers A, B and C. The inner layer 95 consists of two half-tubular parts of foam material, each of which has its entire outer surface covered with a coating 103 of rubber-like or silicone material and is prefabricated in a similar manner to the half-tubular parts 25 in FIGS. 1 and 2. This inner layer 95 has to withstand the heaviest expansion and contraction and therefore the density of the foam is low, e.g. 50 kg/m$^3$, so as to maintain a high degree of elasticity at low temperatures. In this way cracking of the foam, which would occur if the density thereof were high, is eliminated.

Between the ends of the inner layer 95 and the linings 93 on the ends of the heat-insulating foam layers A, B and C of the pipe units are positioned two hollow rings 98 of rubber-like material or silicone material. These two hollow rings 98, which are fitted in the factory, are filled temporarily with air at a very low pressure through an opening (not shown) in each ring which is then closed by a stopper.

The procedure to complete the joint is described hereafter. When the two pipe unit end parts 14' have been welded together on the site and the coating 24 has been completed as described with reference to FIGS. 1 and 2, the half-tubular parts 95 are forced into the gap between the two hollow rings 98 which are still filled with air at a very low pressure. Prior to this, the said half-tubular parts will have been wetted with a rubber-like solution of the same composition as the coating 24, so that these half-tubular parts 95 will adhere tightly to the said coating 24, as well as to the end surfaces of the hollow rings 98.

This operation having been completed, the stoppers are removed from the hollow rings 98, which are then filled by injection with heat-insulating foam material 98' of a higher density than the density of the layer 95, and the injection holes and air vents are sealed after the foam has cooled and hardened. The foam material 98' in the hollow rings 98 exerts a heavy and steady pressure against the linings 93, thus keeping the whole structure compact and avoiding cracking of the foam and partial destruction thereof. The end surfaces of the rings 98 are kept circular in cross-section during the injection by means of half-collars (not shown) which are removed after the foam has cooled and hardened.

The walls of the hollow rings 98 and the fibreglass-reinforced rubber-like or silicone linings 93 are sufficiently thick to take up the expansion and the contraction of the pipe units in the medium range of cryogenic or geothermic temperatures, thereby ensuring protection for the structure of the foam in the layer 95 by providing crack-proof resilient barriers at both ends thereof.

The half-tubular parts constituting the layer 95 could be composed of an inorganic, rigid, closed-cell foam material or of a granular material instead of one of the materials referred to in the introductory part of this specification. The assembly of these tubular parts 95 is similar to that previously described of the half-tubular parts 25 in FIGS. 1 to 3.

The intermediate foam layer 96 of heat-insulating foam material likewise consists of two prefabricated and coated half-tubular parts produced in a similar manner to the half-tubular parts 25 in FIGS. 1 and 2 and having coatings 110 with smooth inner and outer surfaces. The end parts of the coatings 110 of these half-tubular parts have, however, thicker walls than the inner and outer circumferential parts therof. The thickly coated ends of the half-tubular parts of the heat-insulating foam layer 96 abut directly against parts of the linings 93 on the ends of the pipe units. This intermediate foam layer 96 is subjected to lower stresses from expansion and contraction than the foam layer 95, since the temperature differences to which the layer 95 is exposed are considerably smaller than those in the case of the bottom surface of the layer 96. However, the expansion and contraction of the layer 96 are absorbed by the linings 93 and the end parts of the coatings 110. The foam layer 96 is of higher density, e.g. 100 kg/m$^3$, than the foam of layer 95, and thus has a higher compression strength. The procedure for inserting this foam layer 96 over the layer 95 is similar to the procedure used for positioning the layer 95, i.e. the two half-tubular parts of the layer 96 are wetted with a rubber-like adhesive solution of the same composition as the linings 93 and the coatings 103, so that these half-tubular parts 96 adhere tightly to these linings and coatings. This rubber-like solution is sprayed over the longitudinal edges of these tubular parts, which will mate together when they are assembled, as well as over the inner and outer circumferential surfaces thereof.

The outer foam layer 97, since it is liable to be subjected to mechanical impact, e.g. during the laying of the pipe in trenches, is composed of a very high density structural foam, e.g. 200 kg/m$^3$, and even higher in cases where exceptionally heavy mechanical impact is to be expected.

U-seals 101 having short tubular extensions 101' on the wall parts thereof which constituted the outer limbs of the U-seal and composed of a very flexible rubber-like or silicone material are inserted within the end parts 16' of the outer jacket 16, before the pipe end parts 14' have been welded together and the layers 95 and 96 have been positioned. When the layer 96 has been completed, the U-seals 101 are positioned in the ends of the pipe units with their inner circumferential portions bearing against the outer surface of the coating 110 of the layer 96 and their outer circumferential portions bearing against the inner surfaces of the jacket projecting end parts 16'. The short tubular extension 101' of each U-seal 101 is initially bent radially outwardly. The exposed surfaces of each seal 101 are wetted with a solution of the same rubber-like composition as the linings 93. Then, a two-part metallic mould (not shown), which is provided with injection holes and air vents and having had its inner surface coated with a thin layer of paraffin for facilitating subsequent removal, is positioned between the seals 101 and in coaxially spaced relationship around the coating 110. If necessary, spacing rings, similar to the spacing rings 51 in the embodiments according to FIGS. 1 and 2, may be provided between the coating 110 and the mould.

The injection of the heat-insulating foam material of the layer 97 is carried out in a similar fashion to that previously described with reference to FIGS. 1 and 2, in connection with the foam filling 28. When the foam of the layer 97 has cooled and hardened, the mould is removed. Then the whole surface of the foam layer 97 is sprayed or brushed with a silicone adhesive to close the micro-pores of the foam and to prepare the surface for the application of an outer cover 102. The two extensions 101' of the seal 101 are now pulled towards each other over the foam layer 97. The circumferential flat surfaces of these extensions are then roughened, cleaned and successive coats of rubber-like or silicone adhesive solution are applied over them.

Silicone elastomers adhere practically to all rubber-like material except polyethylene. A further mould (not shown) is now placed over the coated outer surfaces of the extensions 101' on both sides of the joint and secured by belts or the like, this further mould, which can be made of aluminium, steel or polyethylene sheet material, having previously been coated on the inside with paraffin to facilitate its subsequent removal. Filling holes are provided in this mould. A liquid castable resin or elastomer, preferably a liquid silicone, together with a catalyst, is then poured through the filling holes to form the outer cover 102 of the joint. After polymerisation of this material, which takes approximately four hours in a heated atmosphere or twenty hours at ambient temperature, this mould is removed. The outer cover 102 now makes the joint fluid-tight.

In some cases, in extremely difficult working conditions, when the pipe-line is laid in contact with stones or rocks, the last-mentioned mould may be kept on. In such a case, before the mould is fitted, its inner surface, instead of being coated with paraffin, is treated with a silicone primer adhesive to improve its adherence and form a strong seal which is liquid and vapour-proof, thereby providing considerable additional protection for the joint.

Other castable resins having similar properties could be used. The outer cover may alternatively be produced by applying styrene- or epoxy-reinforced fibreglass as previously described with reference to FIGS. 4 to 6. The ends of the outer cover 102 are advantageously extended over the collars 18' as shown at 102' so as to enhance the fluid-tightness of the joint in these regions.

The embodiment of the invention illustrated in FIG. 8 is designed to provide additional protection against vapour penetration into the heat-insulating foam in pipe-lines for conveying fluids at extremely low cryogenic or geothermic temperatures, where very considerable differential expansion and contraction will occur between the butt-welded metal pipes and their jackets, between periods when the pipe-lines are in use and periods when they are not in use. This penetration is aggravated in installations transporting fluids, the temperatures of which differ very considerably from ambient temperature. The installation of pipe-lines, which are to be used, for example, for the conveyance of liquefied natural gas, may involve underwater pipe-lines and the requirements for special safety in cryogenic service in a marine environment are very stringent. Vapour penetration sometimes already begins when the pipes are transported for long distances, especially in hot weather. This penetration of vapours increases at low cryogenic temperatures when moisture trapped in the closed cells of the rigid foam would freeze and the insulation then gradually disintegrates where it is in contact with the surface of the steel pipe.

The transmission of the vapour may occur as a result of diffusion through the micro-pores or as a result of mechanical damage during the laying of the pipes. By progressive escalation of the deterioration of the foam, its insulating properties may be almost entirely destroyed.

The pipe units on each side of the joint shown in FIG. 8 differ from those in the embodiment according to FIG. 7 in that the intermediate heat-insulating foam layer B is shorter than the inner heat-insulating layer A and the outer heat-insulating foam layer C is in turn shorter than the intermediate heat-insulating foam layer B, so that the linings 93 in the ends of the pipe units are of stepped annular configuration.

To form a joint between the two pipe units, a bellows element 116 is welded on the site between the proximate end parts of the respective pipes 14, which bellows element will serve in the finished pipe-line to accommodate relative movements between the pipe end parts connected thereby and to absorb stresses, especially at bends in the pipe-line. Then, after the hollow sealing rings 98 have been positioned and filled with foam material 98', a thick layer 115 of a plastified silicone compound is applied over the bellows element 116 and over parts of the coating 24 on the adjoining end portions of the pipe end parts 14', which layer 115 will later fill the space between the bellows element and these parts of the coating 24 on the one hand and interior coated surface parts of the inner heat-insulating layer 95 on the other hand. The last-mentioned layer 95 is formed, as in the embodiment according to FIG. 7, from two half-tubular parts of heat-insulating material having coatings 103 of rubber-like or silicone material.

A separator 107, provided with corrugations to accommodate the relative axial movements between the coated foam layer 95 and an intermediate coated heat-insulating layer 96 in the finished pipe-line, is then formed by bending a previously corrugated steel sheet around the coated foam layer 95 and securing it by means of silicone adhesive tapes (not shown) which are located at convenient distances apart along the separator 107. To make the separator 107 vapour-tight, its ends are sealed by a silicone adhesive to previously prepared and cleaned surfaces of the hollow sealing rings 98 and a longitudinal seam, formed by overlapping the longitudinal margins of the sheet, is likewise sealed by a silicone adhesive or by brazing the said margins together. After this has been done, the intermediate heat-insulating layer 96 is formed from coated half-tubular parts in a similar manner to that described for the corresponding layer 96 in the embodiment according to FIG. 7. The separator 107 is of steel. Alternatively, a low expansion alloy, such as INVAR, may be used to form the separator. In the embodiment according to FIG. 8, however, the end parts of the coated intermediate layer 96 are supported on the inner annular stepped portions of the linings 93. Next, a second tubular separator 107' is applied over the coated intermediate heat-insulating layer 96, in a similar manner to that in which the separator 107 was applied over the inner heat-insulating layer 95. The tubular separator 107', which may be formed from a stainless steel or aluminium sheet, is bent round into a tube having a longitudinal seam formed by overlapping the longitudinal margins thereof and is arranged with its end margins supported on the outer annular stepped portions of the linings 93. This tubular separator 107' is made fluid-tight along its longitudinal seam and at its ends in a similar manner to the separator 107. Annular U-seals 101, with extensions 101', inserted in the annular spaces between the outer stepped portions of the linings 93 and the projecting end parts 16' of the jackets 16 of the pipe units, are likewise sealed by means of a silicone adhesive to the end and outer surfaces of the end parts of the separator 107'. Then, the extensions 101' of the annular U-seals 101 having been bent outwardly and coated, in the same way as those in the embodiment according to FIG. 7, a two-part metallic mould (not shown) is positioned coaxially around the separator 107' and foam-forming material is injected to form an outer heat-insulating foam layer 97.

After the foam layer 97 has hardened, a third tubular separator, similar to the separators 107 and 107' could, if desired, be fitted over it, while the extensions 101' of the U-seals 101 are still bent outwardly. Alternatively, one of the separators 107 or 107' could be omitted.

The subsequent procedure, including preparation of the joint surfaces and the moulding of the outer cover 102, is essentially the same as that already described for completing the joint according to FIG. 7.

The joint shown in FIG. 8 is capable of accommodating substantial expansion and contraction of the pipes 14 of the pipe units on each side of it with respect to the jackets 16 of these pipe units. The greatest expansion and contraction, which will occur in the pipes 14, will be accommodated by the bellows element 116 and the next greatest, which will be between the inner foam layers A of these pipe units, will be accommodated by the parts of the linings 93 on the ends of these foam layers and the end walls of the sealing rings 98; rather less expansion and contraction, which will occur between the intermediate foam layers B of the said pipe units, will be accommodated by the parts of the linings 93 on the end walls of these layers B and by the coatings on the ends of the foam layer 96 and a still smaller amount of expansion and contraction, which will occur between the foam layers C of the said pipe units, will be accommodated by the parts of the linings 93 on the ends of the foam layers A and the parts of the annular U-seals 101 between these coating parts and the ends of the foam layer 97.

The separator 107, being corrugated, can also accommodate such expansion and contraction as will occur between the foam layers 95 and 96. In addition, the provision of sealed separators, such as 107 and 107', prevents vapour transmission from one foam layer to the next.

By "zig-zag planning", it is possible to ensure that the stresses caused by expansion and contraction of a pipe-line will be taken up mainly at the bends between successive lengths thereof. Such zig-zag planning can be utilised with advantage in pipe-lines formed by joining together pipe units of the kind referred to as described above. In certain circumstances, however, the relative movements, due to differential expansion or contraction between the pipes 14, the foam layers 15 (FIGS. 1 to 6), or A, B and C (FIGS. 7 and 8) and the jackets 16 of the pipe units in the straight lengths of such a pipe-line, will be too great to be wholly accommodated by this means. In order to make good this deficiency, the pipe units may be provided, as shown in FIG. 9, at intervals along their lengths, with flexible annular supports 141 between the metal pipe 14 and the jacket 16. Each of these supports 141 comprises a radially inner part 142 composed of a rubber-like material of high elasticity, in which is embedded a stiffening insert 143 of fibreglass-reinforced board or thin sheet metal, and a radially outer part 144 composed of very low density polyurethane foam material which is capable of substantial expansion and contraction without damage. The radially outer part 144 is secured and sealed to the radially inner part by means of an adhesive. These supports 141 are fitted on the pipe 14 prior to the application of the foam layer 15. The heat-insulating foam material 15, which is of higher density than the material of the radially outer parts 144 of the supports 141, is applied by spraying after the supports 141 have been fitted on the pipe 14. Surplus foam material is then trimmed from the outer circumference of the foam layer 15, after which the outer jacket 16 is formed over the outer surfaces of this foam layer 15 and of the radially outer parts 144 of the supports 141.

In use, the substantial stresses due to differential expansion and contraction in the straight lengths of the pipe-line and in the bends, are accommodated by deformation of the radially outer parts 144 of the supports 141. The number of supports 141 required in each pipe unit exposed to the stresses can be calculated according to the temperature differences, the length of the pipe unit and other relevant factors, especially the stresses in the bends.

I claim:

1. A heat-insulated joint between two heat-insulated pipe units, each of said pipe units comprising:
   a pipe,
   an outer jacket of fluid-impervious material surrounding said pipe in coaxially spaced relationship therewith, and a filling of expanded heat-insulating material provided between said pipe and said outer jacket and extending over the greater part of the length of said pipe,
   the end parts of said pipe projecting beyond the corresponding ends of said filling and the end parts of said outer jacket projecting likewise but for a shorter distance, so that annular recesses are formed in the ends of the pipe unit,
   and said heat-insulated joint comprising:
   means interconnecting proximate projecting end parts of the pipes of said two pipe units,
   annular seals of rubberlike material located in the annular recesses in the proximate ends of the two pipe units,
   each annular seal having an outer circumferential portion lying in contact with the radially inner surface of the projecting end part of the jacket of the respective pipe unit and an annular portion supported by at least the radially outer part of the end face of the filling of the respective pipe unit,
   a tubular cover extending across the gap between the proximate end parts of the jackets and having its ends joined to the outer circumferential portions of said annular seals, and
   a further expanding filling of heat-insulating foam material within the annular space enclosed by the seals and the cover and surrounding the interconnected pipe end parts,
   the outer circumferential portions of the annular seals being held by said further filling in fluid-tight sealing contact with the radially inner surfaces of the projecting jacket end parts and the annular portions of the annular seals being pressed by said further filling in fluid-tight sealing relation toward the end faces of the corresponding pipe units.

2. A joint as claimed in claim 1, wherein said further filling is of higher density in the regions surrounded by the circumferential parts of said annular seals than in other parts of said further filling.

3. A joint as claimed in claim 2, wherein the further filling has in the said regions of density of between 40 kg/m$^3$ and 200 kg/m$^3$.

4. A joint as claimed in claim 2, wherein the further filling has in the said regions a density exceeding 200 kg/m$^3$.

5. A joint as claimed in claim 1, wherein annular end portions of the annular seals are seated against linings of heat-resistant, rubber-like material covering at least the radially outer parts of the end faces of the fillings between pipes and outer jackets of the pipe units.

6. A joint as claimed in claim 1, wherein the annular seals are constituted by hollow rings and said further filling is constituted by separate fillings of heat-insulating foam material provided respectively within the hollow rings and in a further space enclosed by the tubular cover and located at least partly between outer surface parts of said hollow rings.

7. A joint as claimed in claim 6, wherein the annular seals are formed integrally with sleeve parts which extend axially towards each other from the outer circumferential portions of said annular seals and form parts of said cover.

8. A joint as claimed in claim 1, wherein the outer circumferential portion of each annular seal is constituted by an extension on one end of a corresponding sleeve part, which sleeve part extends from said one end towards the sleeve part of the other said annular seal, and the annular end portion of each annular seal includes an inturned flange on the end of the outer circumferential portion remote from the respective sleeve part.

9. A joint as claimed in claim 8, wherein the annular end portions of the annular seals also include fibre-reinforced rings supported by the radially inner parts of the end faces of the respective pipe units, said rings having inner cylindrical surfaces secured and adhesively sealed to the pipe end parts of the respective pipe units and outer marginal parts sealingly joined to inner marginal parts of said inturned flanges.

10. A joint as claimed in claim 1, wherein the end faces of the fillings of the pipe units are of concave cross-section and the opposed surfaces of the annular end portions of the seals are of a complementary convex cross-section.

11. A joint as claimed in claim 1, wherein the radially outer parts of the end faces of the fillings of the pipe units are recessed with respect to the radially inner parts of said end faces so that an annular step is provided between said radially outer parts and said radially inner parts and the annular seals are located at least partly within said recessed radially outer parts.

12. A joint as claimed in claim 11, wherein the recessed radially outer parts of the end faces heat-insulating foam layers have a radial width substantially smaller than that of the radially inner parts of said end faces.

13. A joint as claimed in claim 1, including annular gaskets surrounding the projecting end parts of the jackets of the pipe units and reinforcing collars in turn surrounding the annular gaskets for restricting expansion of said jacket projecting end parts under the outward pressure of said further expanded foam filling.

14. A joint as claimed in claim 1, wherein the heat-insulating foam material in the space enclosed by the cover comprises a plurality of prefabricated segments of said material assembled around the interconnected pipe end parts in the form of a segmental tube and a tubular body of injected foam material between the outer surface of said segmental tube and the inner surface of the cover and wherein a layer of rubber-like material is provided between inner surface parts of the tubular body of injected foam material on the one hand and the outer circumferential surface and end surfaces of the segmental tube on the other hand.

15. A joint as claimed in claim 9 wherein part of the outer circumference of each seal extends beyond the end edge of the projecting end part of the outer jacket of the respective pipe unit so as to provide a substantially cylindrical seating for the corresponding end part of the cover.

16. A joint as claimed in claim 1, wherein the seals provided in the annular recesses in the ends of each pipe consist of U-section rings with the part forming the base of the U supported by the corresponding filling end face and the parts forming the two main limbs of the U sealed respectively with respect to the projecting pipe and jacket end parts.

17. A joint as claimed in claim 16, wherein the U section seal is a composite seal comprising a flexible radially annular part and a relatively stiff internally reinforced inner annular part, the outer annular part being joined and sealed to the inner annular part.

18. A joint as claimed in claim 1, wherein the filling between the pipe and jacket of each pipe unit consists of a plurality of layers of heat-insulating foam material and wherein the further filling surrounding the interconnected pipe end parts of said pipe units and enclosed by the seals and cover of the joint comprises a corresponding plurality of coaxial heat-insulating foam layers, including:

an inner layer consisting of a tubular assembly of prefabricated segments of heat-insulating foam material with hollow rings of rubber-like material, each filled with heat-insulating foam material located between its ends and the radially inner parts of the end faces of the heat-insulating foam layers of the pipe units, at least one intermediate layer consisting of a tubular assembly of prefabricated segments of heat-insulating foam material, each segment being coated over its entire surface area with a covering of rubber-like material which is thicker on the ends of the segments than on the inner, outer and longitudinal mating surfaces thereof, and an outer layer of heat-insulating foam material enclosed by the cover and located between the seals which are held in fluid-tight sealing contact with the radially inner surfaces of the projecting end parts of the pipe unit jackets.

19. A joint as claimed in claim 18, wherein the ends of each successive heat-insulating foam layer, in the radially outward direction, of each pipe unit are set back with respect to the corresponding ends of the next heat-insulating foam layer within it, so as to form a series of annular steps at each end of the adjoining pipe units and wherein each successive layer of the heat-insulating foam layers surrounding the interconnected pipe unit parts is longer than the next heat-insulating foam layer within it and has its ends supported by a corresponding one of said steps.

20. A joint as claimed in claim 19, wherein the stepped ends of the heat-insulating layers of each pipe unit support stepped linings providing seatings for said annular portions of the annular seals.

21. A joint as claimed in claim 19, wherein a tubular separator formed with annular corrugations is provided between the innermost layer of the heat-insulating layers surrounding the interconnected pipe end parts and the next heat-insulating layer surrounding it and the end parts of said tubular separator are seated on parts of the outer surfaces of the hollow rings of rubber-like material.

22. A joint as claimed in claim 19, wherein a further tubular separator is provided between the outermost layer and the adjacent intermediate layer of the heat-insulating foam layers surrounding the interconnected pipe unit end parts, said further tubular separator having its end parts supported on the tread portions of the outermost steps on the ends of the proximate pipe units and sealingly joined to the radially inner parts of the respective seals.

23. A pipe unit as claimed in claim 1, wherein said means interconnecting the proximate projecting end parts of the pipes of said two pipe units is constituted by a bellows element welded between said proximate projecting end parts.

24. A heat-insulated pipe unit comprising:
a pipe
an outer jacket of fluid-impervious material surrounding said pipe in coaxially spaced relationship therewith, and
a filling of expanded heat-insulating material provided between said pipe and said outer jacket and extending over the greater part of the length of said pipe the end parts of said pipe projecting beyond the corresponding ends of said filling and the end parts of said outer jacket projecting likewise but for a shorter distance, so that annular recesses are formed in the ends of the pipe unit wherein annular supports are provided between the pipe and jacket at intervals along the length of said jacket, each annular support comprising:
a collar of rubber like material stiffened by an internal fixedly mounted on the pipe and
an outer annular cushioning ring of low density polyurethane foam material having its inner circumference joined to the outer circumference of the collar and its outer circumference presses against the interior surface of the jacket.

* * * * *

UNITED STATES PATENT AND TRADEMARK OFFICE
CERTIFICATE OF CORRECTION

PATENT NO. : 4 162 093
DATED : July 24, 1979
INVENTOR(S) : Frantisek Sigmund

It is certified that error appears in the above-identified patent and that said Letters Patent are hereby corrected as shown below:

Col. 22, line 42; change "of density of" to ---a density of---.

Col. 23, line 62; before "annular" insert ---outer---.

Col. 24, line 48; change "Claim 19" to ---Claim 21---.

Col. 26, line 5; after "internal" insert ---reinforcement and---.

Col. 26, line 9; change "presses" to ---pressed---.

Signed and Sealed this

Third Day of February 1981

[SEAL]

Attest:

RENE D. TEGTMEYER

*Attesting Officer*  *Acting Commissioner of Patents and Trademarks*